INVENTORS:
RONALD B. GOLDNER,
JEROME J. SURAN,

BY Robert J. Steinmeyer
THEIR ATTORNEY.

June 2, 1959 R. B. GOLDNER ET AL 2,889,542

MAGNETIC COINCIDENCE GATING REGISTER

Filed March 22, 1957 3 Sheets-Sheet 2

INVENTORS:
RONALD B. GOLDNER,
JEROME J. SURAN,
BY Robert J. Steinmeyer
THEIR ATTORNEY.

INVENTORS:
RONALD B. GOLDNER,
JEROME J. SURAN,
BY Robert J. Steinmeyer
THEIR ATTORNEY.

United States Patent Office 2,889,542
Patented June 2, 1959

2,889,542

MAGNETIC COINCIDENCE GATING REGISTER

Ronald B. Goldner, Cambridge, Mass., and Jerome J. Suran, Syracuse, N.Y., assignors to General Electric Company, a corporation of New York Application March 22, 1957, Serial No. 647,785
6 Claims. (Cl. 340—174)

This invention relates to a magnetic coincidence gating register. More particularly, the invention relates to a register which can, for example, be used either as a code detection circuit or to directly transform binary information represented by sequential signals into stored information which can be continuously and non-destructively read out as parallel binary information.

It is frequently desirable in digital computer or control systems and in pulse communication or data link systems to transform binary coded information represented by a series of pulses occurring sequentially in time on a single information channel to information represented by pulses occurring simultaneously on a plurality of such channels. The former type of representation is commonly called "sequential" whereas the latter is commonly called "parallel." It has been the practice in the art to transform sequential binary information into parallel binary information through the use of a shifting register consisting of a plurality of cascaded bistable circuits, the two stable states of which are adapted to represent a binary "1" and a binary "0" respectively. In such shifting registers the first digit or bit of sequential binary information, as represented by the presence or absence of a pulse, is read into the first bistable circuit of the register. A shifting pulse is then applied to transfer or shift the first stored digit to the succeeding stage. Of course it will be understood that such a register is provided with as many stages or bistable circuits as there are bits or digits of the binary word or number which it is adapted to receive. After the first shift operation the next binary bit of information is read into the first stage of the register and the cycle of shift and read-in is repeated until an entire number or word has been read into the register. Thereafter the content of each individual stage of the register may be simultaneously read out on a plurality of individual output channels.

It will be apparent that a bit of information cannot be read into such a register during a shifting operation and that therefore the total minimum time required to read an entire word into such a register is approximately twice that which would be required if no shifting operation were necessary. Furthermore, when non-volatile magnetic devices are used for such a register, it has in the past been necessary to use a destructive read-out technique. By this is meant that the same action which provides a single output pulse for each of the parallel channels also resets the register to its cleared state in which each of the bistable circuits is in its zero representing condition. With such a destructive read-out the information which has been read into the shifting register is lost or destroyed after the parallel representation of it has been obtained during a single pulse interval. In many applications it would be desirable to have a non-destructive parallel read out of stored information from a register composed of non-volatile elements. That is to say, it would be desirable to have a parallel read-out of stored binary information which may continue for a period of time of any predetermined length or be repeated any desired number of times before the register is again cleared.

It is therefore an object of this invention to provide an information register adapted to directly transform sequential binary information into stored parallel binary information without the use of a shifting operation.

It is a further object of this invention to provide such an information register which also affords a continuous or non-destructive parallel read-out.

It is a further object of this invention to provide such an information register which may also be used as a code detection network in such application as a selective call communication system.

It is a further object of this invention to provide such an information register utilizing magnetic elements which do not require the application of any external power in order to retain information which has been read into them.

Briefly, in accordance with one aspect of the invention, sequential binary information is applied simultaneously to one information input terminal of each of a plurality of magnetic core devices and an operating pulse is applied sequentially to another information input terminal of each of the devices. Each of these devices has two stable states and each device further requires a coincidence of its two input pulses to cause it to change from one stable state to the other. That is to say, each of the devices is a logical "and" circuit with stored setting. An operating pulse which may be derived from a trigger pulse by means of a magnetic delay element is applied to one input terminal of each device sequentially in time so as to coincide with information pulses applied to the other input terminal of all of the devices simultaneously. Thus, any particular bit of information is read into only the one device to which an operating pulse is being applied at the time of occurrence of the pulse representing that particular bit of information. It is thus apparent that each bit of sequential information is directly stored in only that one of the group of bistable devices which is selected for it by the sequential operating pulses. Since each bit of information is thus initially read into the correct bistable device, no shift operation is required.

While the novel and distinctive features of the invention are particularly pointed out in the appended claims, a more expository treatment of the invention, in principle and in detail, together with additional objects and advantages thereof, is afforded by the following description and accompanying drawings of representative embodiments in which:

Figure 1:
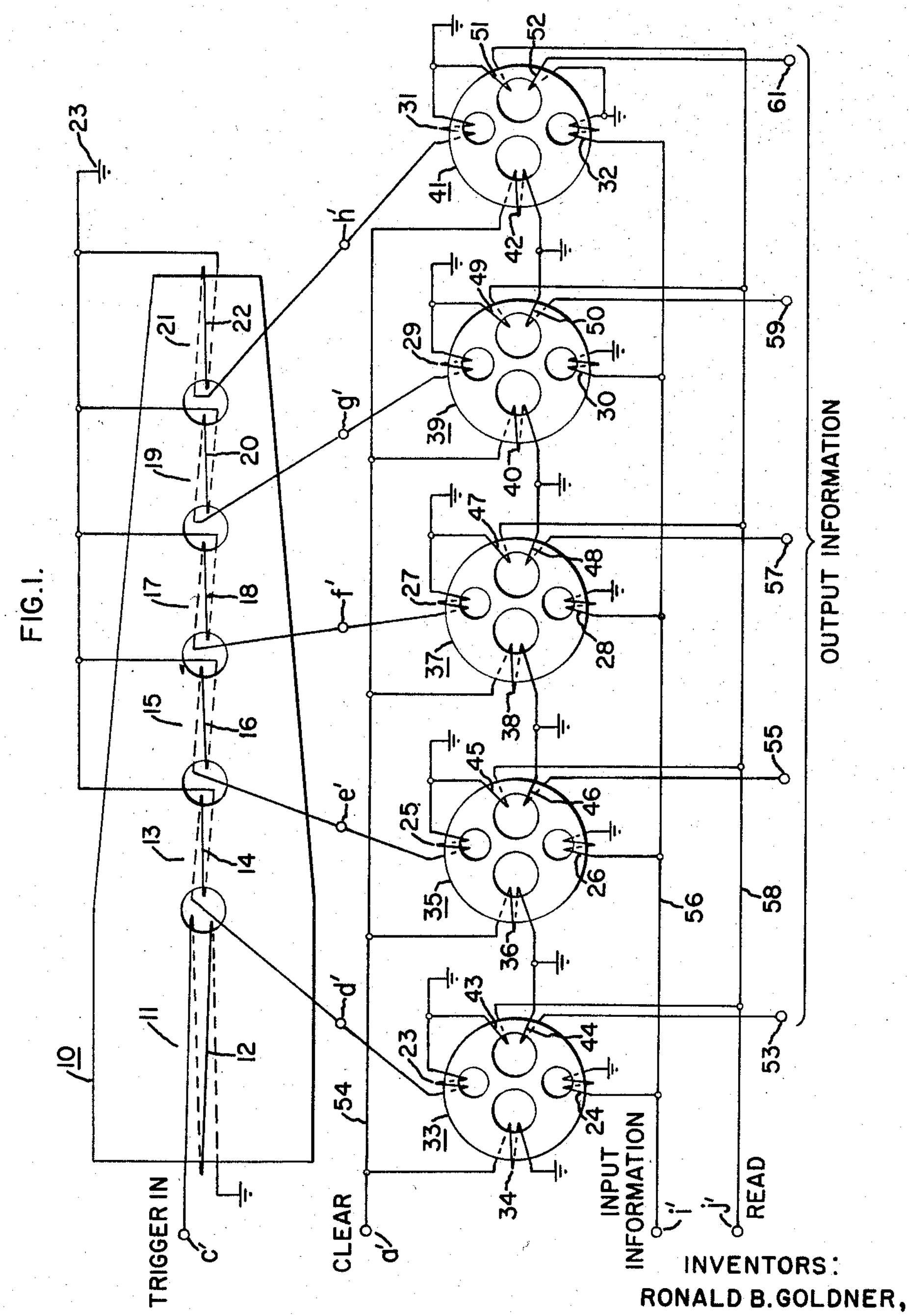
Fig. 1 is a schematic diagram of an information register which is adapted to directly transform sequential binary information to stored information which may be read out on a plurality of parallel channels.

Turning now to the drawing and in particular to Fig. 1, there is shown a magnetic delay element 10 which is adapted to produce a uniform sequence of operating pulses from a single input trigger pulse. Magnetic delay element 10 is more fully described and is claimed in the copending application of Bernard Silverman, S. N. 631,147, filed December 28, 1956, entitled "Magnetic Delay Element" and assigned to the assignee of the present application, which invention was made by said Bernard Silverman prior to our invention. We, therefore, do not herein claim anything shown or described in said Silverman application, which is to be regarded as prior art with respect to the present application.

As more fully described in the above noted Silverman application, core 10 is preferably composed of a magnetic material having a substantially rectangular hysteresis characteristic. Core 10 may, for example, consist of a ferrite material having hysteresis characteristics similar to those of the material known commercially as "General Ceramic S–1" or other comparable material. In Fig. 1 core 10 is shown as having an input leg 11 and five output legs 13, 15, 17, 19 and 21 respectively. Although the drawing is not to scale, it will be understood that in practice input leg 11 should have a minimum cross-sectional area at least equal to the sum of the combined minimum cross-sectional areas of all of the output legs in order to provide a return path for saturating flux flow through all of the output legs as will be explained below. The core 10 may also be tapered as shown since the minimum cross-sectional areas of the upper and lower portions of the core respectively which are necessary to provide sufficient flux paths to saturate all of the output legs must be greater to the left of leg 13 than to the left of leg 15, etc.

Figures 2, 4, 5, 6:
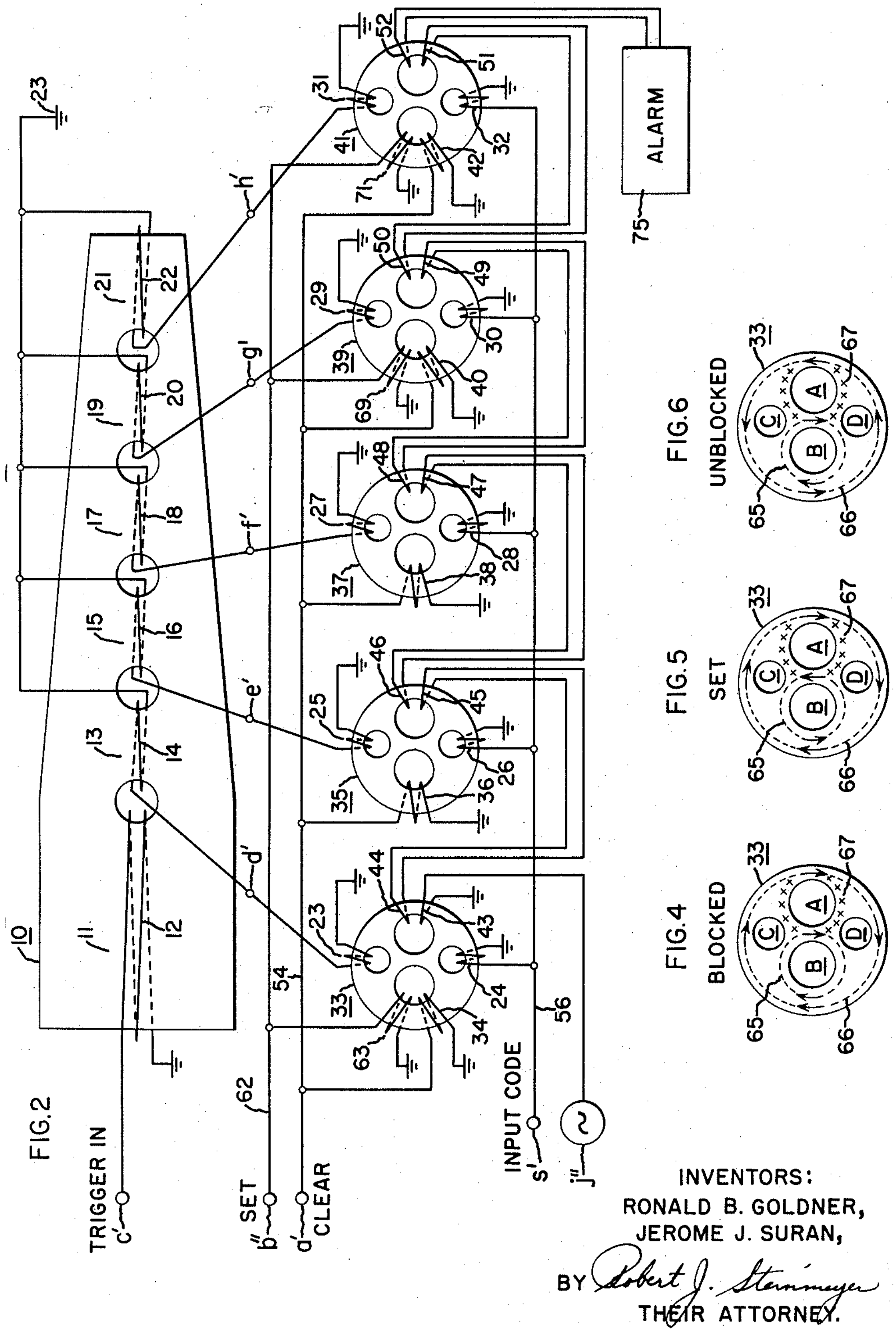
Fig. 2 is a schematic diagram showing how the information register of Fig. 1 may be modified for use as a code detection network.
Figures 4 and 6 are flux diagrams illustrating different flux distributions occurring in the "and" devices of the systems of Figures 1 and 2.
Fig. 5 is a flux diagram illustrating a flux distribution which occurs in the "and" devices of the system of Fig. 2.

It will further be understood that although any desired number of output legs may in general be used, when used as a part of the information register of Figure 1 or 2 the magnetic delay element 10 should have as many output legs as there are bits or digits in the word or number which the register is adapted to receive. That is to say, in an information register adapted to receive or transform an *n*-bit word, magnetic delay element 10 should have one input leg and *n* output legs. An input winding 12 is wound on the input leg 11 and output windings 14, 16, 18, 20 and 22 are wound on legs 13, 15, 17, 19 and 21 respectively. One end of each of the output windings is connected to a common ground 23, whereas the other end of each winding is brought out to the separate respective terminals *d'*, *e'*, *f'*, *g'*, and *h'*.

Figure 3:
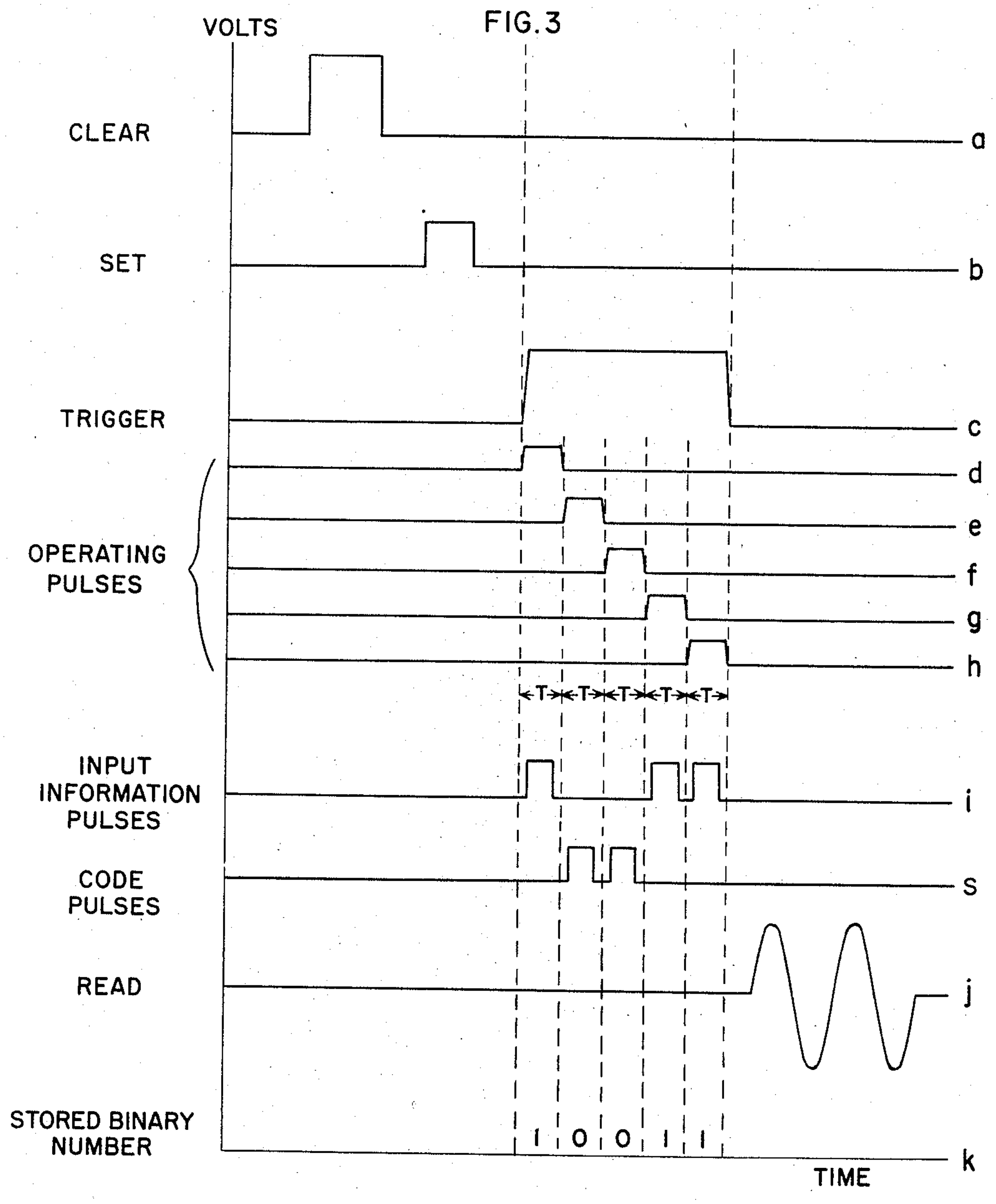
Fig. 3 is a graph of volt-time waveforms appearing in the systems of Figs. 1 and 2. Parts *a, c, d, e, f, g, h, i, j* and *k* of Fig. 3 are applicable to Fig. 1 whereas parts *a, b, c, d, e, f, g, h, s,* and *j* of Fig. 3 are applicable to Fig. 2.

In operation, when a trigger pulse, such as shown in Fig. 3*c*, is applied to terminal *c'* of input winding 12, operating pulses such as shown in Figures 3*d*, *e*, *f*, *g* and *h*, respectively will appear at terminals *d'*, *e'*, *f'*, *g'* and *h'*. It will be noted that the waveforms shown in Fig. 3 have reference letters, *a*, *b*, *c*, etc. applied to them which correspond to the reference characters *a'*, *b'*, *c'*, etc. which are applied in Figures 1 and 2 to the terminals or points in the register at which the waveforms appear or are applied.

As explained in the above noted Silverman application, the trigger pulse *c* applied to terminal *c'* of input winding 12 should have the proper polarity to cause flux to flow in such a direction as to reverse the direction of saturation of the assumedly presaturated output legs. In cyclic operation of the register, to be discussed in detail below, this assumed pre-saturation of the output legs may be achieved by applying a register clearing pulse, shown, in Fig. 3*a*, to input terminal *c'* through an inverter (not shown) before each new word is read into the register. Of course, if desired, a separate pre-saturating pulse having a polarity opposite to that of pulse *a* could alternatively be used.

The applied trigger pulse *c* first drives pre-saturated leg 13 through the unsaturated region of its hysteresis characteristic and finally into its reverse saturated state. During this interval of time operating pulse *d* is induced in winding 14. This process is then repeated sequentially for each of the other output legs 15, 17, 19 and 21. During the excursion of each leg through the unsaturated region of its characteristic, an output pulse is generated in its output winding. The resulting series of pulses, *d*, *e*, *f*, *g* and *h*, are the operating or timing pulses for the information register of Fig. 1. The time widths of each of the sequence of operating pulses will be equal when the minimum cross-sectional areas of each of the output legs 13, 15, 17, 19 and 21 are equal to each other since the legs then have equal saturation flux values. The time width, T, of each pulse can be shown to be given by the expression Equation 1 $$T=(2NB_sA)/E$$

where N equals the number of turns in input windings 11, $B_s$ equals the saturation flux density of the square loop magnetic material of core 10, A equals the minimum cross-sectional area of each of the output legs 13, 15, 17, 19 and 21, and E equals the voltage amplitude of the trigger pulse *c* applied to input winding 11. It will be apparent that since the operating pulses are contiguous in time, the time width T of each of the uniform series of pulses may also be considered as the delay time between the beginning of one pulse and the beginning of the next pulse. This relationship results from the fact that when the trigger pulse is applied to input winding 12, the flux in leg 13, which affords the shortest return path length to input leg 11, is first reversed in direction of saturation before any flux flows through the other output legs. Consequently, while pulse *d* is being induced in winding 13 and appearing at terminal *d'*, the rest of the output windings are decoupled from the magnetic circuit. This same action is next repeated for output leg 15 since, after leg 13 has saturated in the direction of flux flow, leg 15 affords the shortest possible return path for flux flow to input leg 11. This flux flow through leg 15 induces pulse *e* in output winding 16. The same action is then repeated via legs 17, 19 and 21 in sequence thereby producing the other operating pulses *f*, *g* and *h* respectively.

These operating pulses, which appear at terminals *d'*, *e'*, *f'*, *g'* and *h'*, respectively, are applied to information input or unblocking windings 23, 25, 27, 29 and 31 respectively of a group of *n* bistable "and" circuits or devices 33, 35, 37, 39 and 41. It will be noted that there is one bistable device for each digit or bit of information which the register is adapted to receive. That is to say, a register adapted to receive an *n*-bit word has *n* bistable devices, of the type shown at 33, each of which has one input winding connected to the output winding on one of the *n* output legs of the associated magnetic delay element.

Each of these bistable "and" devices consists of a signal translating device of the type claimed and more fully described in the copending application of Harold W. Abbott and Jerome J. Suran, Serial No. 632,342, filed January 3, 1957, entitled "Signal Translating Device" and assigned to the assignee of the present application, which invention was made by said Harold W. Abbott and Jerome J. Suran prior to our invention. We, therefore, do not herein claim anything shown or described in said application which is to be regarded as prior art with respect to the present application.

As noted in the aforesaid Abbott-Suran application, such a bistable "and" or coincidence circuit consists of a nine-legged core of magnetic material which may be the same type of material used for the core 10 or any other magnetic material which has a nearly rectangular hysteresis loop. The core is provided with four separate and mutually contiguous apertures. The material between any two of the apertures forms one of five interior legs and the material between any one of the apertures and the periphery of the core forms one of four peripheral legs of the nine-legged core. Each of eight of the legs preferably have substantially the same minimum cross-sectional area, while one of the peripheral legs has a minimum cross-sectional area equal to at least twice the smallest cross-sectional area of any one of the other legs.

Register clearing or blocking windings 34, 36, 38, 40 and 42 are placed on the largest peripheral leg of each of the cores respectively. Separate unblocking windings are placed on each of the two peripheral legs adjacent to the largest peripheral leg of each core. As shown in Fig. 1, one of the unblocking windings on each core is one of the above noted operating pulse or timing information input windings, 23, 25, 27, 29 and 31, respectively, whereas the other unblocking winding on each core is one of the *n* digital information input windings 24, 26, 28, 30 and 32, respectively. Reading signal input windings 43, 45, 47, 49 and 51, and reading signal output windings 44, 46, 48, 50 and 52 respectively are placed upon the fourth peripheral leg of each of the devices 33, 35, 37, 39 and 41, respectively. The reasons for calling these windings "blocking" and "unblocking" windings etc. will be explained below in connection with the operation of the register.

It should first be noted, however, that each of the register clearing or blocking windings, 34, 36, 38, 40 and 42 has one end connected to ground and the other end connected by a common conductor 54 to a terminal *a'*. Each of the operating pulse or timing information input windings 23, 25, 27, 29 and 31 has one end connected to ground and the other end connected respectively to the terminals *d'*, *e'*, *f'*, *g'* and *h'*. Each of the digital information input windings 24, 26, 28, 30 and 32 has one end connected through a common conductor 56 to information input terminal *i'*. Each of the reading signal input windings 43, 45, 47, 49 and 51 has one end connected to ground and the other end connected through a common conductor 58 to reading signal terminal *j'*. Finally, each of the reading signal output windings 44, 46, 48, 50 and 52 has one end connected to ground and has its other end brought out to one of the separate or parallel output information terminals 53, 55, 57, 59 and 61 respectively. It will be apparent that input information terminal *i'* is the single terminal to which sequential binary information is applied, whereas the output terminals 53, 55, 57, 59 and 61 afford the plurality of *n* channels from which parallel or simultaneous binary information may be derived when a reading signal is applied to "read" terminal *j'*.

Considering now the operation of one of the bistable devices, such as the device 33 by way of example, when a register clearing or blocking pulse such as shown at *a* in Fig. 3 is applied to terminal *a'* as shown in Fig. 1, the current flowing through winding 34 induces a flux flow which results in a flux distribution such as is diagrammatically indicated by the arrows in Fig. 4. As indicated by the dashed lines in Fig. 4, flux first flows through the path 65 until all of the legs constituting this path are saturated in the clockwise direction around aperture B as indicated by the arrows. Flux then flows through the peripheral path 66 until all of the legs of the peripheral path 66 are also saturated in the clockwise direction around the periphery.

The core of the device 33 is now said to have been "blocked" by the signal *a* since the directions of flux saturation in the two legs immediately adjacent to the aperture A of the core are opposite in rotational sense with respect to the short flux path 67 formed by magnetic material immediately adjacent to aperture A and indicated by the small crosses in Fig. 4. When the flux in the core 33 has the distribution indicated in Fig. 4, it is apparent that the magnetic path 67 does not afford any coupling between reading signal input and output windings 43 and 44. That is to say, if a small A.-C. signal such as shown at *j* in Fig. 3 is applied to terminal *j'* and hence to winding 43 while the core is in its blocked state, no output signal appears at terminal 53. This results from the fact that for either phase of the alternating current signal *j*, at least one of the legs adjacent to aperture A is already saturated in the direction in which the current flow through winding 43 would tend to drive the flux. Since there can be no flux flow, winding 44 is effectively decoupled from winding 43 and no output signal appears at terminal 53. This blocked state of a core may conveniently be used to represent a binary zero. Therefore blocking winding 34 may alternatively be called a register clearing winding and terminal *a'* to which the blocking or clearing pulse is applied may be termed the register clearing terminal.

When the flux distribution of core 33 is changed from that shown in Fig. 4 to that shown in Fig. 6, the core is said to be "unblocked" since a reading signal *j'* applied through terminal *j* to winding 43 will then be coupled to winding 44 by flux flow around the magnetic circuit or path 67 surrounding aperture A and an alternating current signal will appear at terminal 53. This results from the fact that when the core is in the unblocked state shown in Fig. 6 the legs adjacent to aperture A are saturated in the same rotational sense with respect to path 67 surrounding aperture A, whereas in the blocked state shown in Fig. 4 and noted above, the legs adjacent to aperture A are saturated in opposite rotational senses with respect thereto. Therefore in the unblocked state flux can be transferred back and forth around magnetic circuit 67 by an applied A.-C. signal whereas in the blocked state flux can not be so transferred. Since in the unblocked state of the core a read-out signal will appear at terminal 53 when a read-in signal is applied to terminal *j'*, this unblocked state may conveniently be used to represent a binary "one" in a manner similar to the above noted use of the blocked state to represent a binary "zero."

The "set" state of the core shown diagrammatically in Fig. 5 is, of course, also an unblocked state. With the polarity conventions assumed, however, the flux distribution shown in Fig. 5 does not occur as a static state in the operation of the system of Fig. 1, but rather may be brought about by the application of a "set" pulse *b* to terminal *b''* of the code detection circuit of Fig. 2 in a manner and for a purpose which will be explained in detail below in connection with the discussion of the operation of the system of Fig. 2.

As noted above, the blocked state of the core shown in Fig. 4 may be produced by the application of a blocking or register clearing pulse *a* to terminal *a'* of winding 34. The core may be changed from this blocked state to the unblocked state shown in Fig. 6 by reversing the flux in peripheral path 66 without reversing the flux in the shorter interior path 65. The required reversal of flux in the peripheral path 66 is accomplished in the information register of Fig. 1 by the coincident application of "half-pulses" to the unblocking windings such as windings 23 and 24 respectively of exemplary core 33. For the purposes of this specification the term "half-pulse" is used to mean a pulse having at least half of the energy required to reverse all of the flux in the peripheral path 66 but not having sufficient energy to reverse any of the flux in any actually possible complete flux path including the leg bearing the unblocking winding to which the half-pulse is applied. It will be noted that, as more fully explained in the above noted Abbott-Suran application, the shortest apparent flux paths immediately surrounding apertures C and D are not actually possible paths when the core is blocked since the legs between apertures B and C and between apertures B and D respectively are then already saturated in the direction in which the unblocking pulses would tend to cause flux to flow.

In practice the half-pulses are obtained by limiting the current in the operating pulses *d*, *e*, *f*, *g*, and *h* and in the information pulses *i*. In the case of the information pulses this current limiting may be accomplished by any conventional current limiting device such as a resistor. In the case of the operating pulses a resistor may be used to limit the current if desired but is not necessary where the appropriate relative dimensions of the cores and the appropriate number of turns are used in magnetic delay element 10 and in the bistable devices such as signal translating device 33. Since the appropriate relative dimensions are governed by considerations resulting from the relationship expressed in Equation 1 and since, alternatively, a current limiting resistor may, if desired, be used between terminal *d'* and winding 23, it will be apparent to those skilled in the art that appropriately limited pulses may readily be obtained for any particular set of dimensions or configurations of the cores.

The overall mode of operation of the information register of Fig. 1 will now be apparent. The operating cycle may be summarized as follows. Referring to Figures 1 and 3, a clear pulse, *a,* which may be derived from any convenient source in any apparatus in which the information register is used, is first applied to terminal *a'* of the register. As explained above this pulse creates a blocked or zero representing flux distribution, such as illustrated in Fig. 4, in all of the "and" devices 33, 35, 37, 39 and 41. This pulse, or one derived from it, is also used to resaturate the output legs 13, 15, 17, 19 and 21 of magnetic delay element 10 in such a direction that when the direction of saturation is later reversed the resulting operating pulses will have the correct polarity to cause a reversal of flux direction in the peripheral paths of the bistable elements. It will be apparent to those skilled in the art that more than one consistent polarity conventions exists for the overall register operation and the desired relations may be achieved either by selecting the polarity of applied pulses or by properly phasing the sense of the windings applied to the cores.

Immediately after the application of the clear pulse *a* the register of Fig. 1 is ready to have a sequentially presented digital number read into it. The set pulse, *b,* is not used in the operation of the device of Fig. 1. For purposes of illustration only, the digital number is shown in Fig. 3 as being the binary number "10011" (equivalent to the decimal number nineteen) as represented by the input information pulses, *i,* which occur in the first, fourth, and fifth intervals, respectively of a sequence of preselected time intervals. If the register is used in a digital computer, the pulses *i* may, for example, conveniently be gated by the clock pulses which will thus necessarily occur within such predetermined time intervals.

Concurrently with the application of the number representing information pulses *i* to terminal *i'*, a trigger pulse, *c,* having a time duration equal to the total time duration of the binary number or word is applied to terminal *c'* of magnetic delay element 10. Operating pulses, *d, e, f, g,* and *h* are derived from trigger pulse *c* in the manner explained above so as to occur in time coincidence with the pulse intervals of the binary number being applied to information terminal *i'*. This synchronization of the operating and the number representing pulses may, for example, conveniently be achieved by deriving trigger pulse *c* from a multivibrator which in turn is triggered by clock pulses from the same source as the clock pulses used to represent the digital information. Of course, it should also be understood that operating pulses *d, e, f, g* and *h* could be derived form any network or switching means which would sequentially apply them to terminals *d', e', f', g'* and *h'* in the correct time sequence. Magnetic delay element 10 is merely one example of a particularly simple and reliable switching network which may be used for this purpose.

It is only necessary that a series of *n* operating pulses such as *d, e, f, g* and *h* be applied one at a time and in time sequence to one of the two information input terminals of each of the bistable "and" devices 33, 35, 37, 39 and 41, and that concurrently therewith the digital information representing pulses, *i,* be applied simultaneously to the other information input terminal of all of the bistable "and" devices in parallel. Here it will be understood that the first set of information input terminals referred to are the terminals *d', e', f', g'* and *h'* of unblocking windings 23, 25, 27, 29 and 31, whereas the second set of information input terminals referred to are the connections to unblocking windings 24, 26, 28, 30 and 32. It will be recalled that each of the cores are initially placed in the blocked or binary "zero" representing state by the clear pulse *a.* Only those cores to which both an operating pulse and an information representing pulse are concurrently or coincidentally applied, will be changed from this blocked state to the unblocked or binary "one" representing state. It is thus seen that each one of the sequence of digital information representing pulses, which are all simultaneously applied to all of the cores, is directly read into the correct core of the register by changing the flux state of only that core which is selected by the operating pulse which occurs in time coincidence with each particular information representing pulse. The sequential binary number is thus directly transformed into a stored binary number which may be read-out in parallel from the bistable "and" devices by applying a reading signal such as the signal, *j,* for example, to read terminal *j'*. For the illustrated binary number, 10011, an output signal will then appear only at terminals 53, 59 and 61. That is to say, there will be signal at the output terminal of those unblocked cores in which a binary one is stored and no signal at the output terminals of those blocked cores in which a binary zero is stored.

If the reading signal is of alternating polarity, as shown in Fig. 3, the read-out from the register is non-destructive in the sense that it may continue for any predetermined length of time or be repeated any desired number of times (as by gating the read signal *j* on and off) without changing the relative binary one or binary zero representing states of the cores of the register. Of course the resulting alternating current parallel outputs may, if desired, be clipped or otherwise shaped to provide any convenient waveform. On the other hand, if a series of unidirectional reading pulses are initially applied to terminal *j'*, a parallel read-out will be obtained for only the first of these pulses since the flux in the path 67 is saturated in the direction of the pulses by the first pulse of the series. Even in this case, however, a subsequent read-out may be obtained by a later applied pulse of opposite polarity. The register can be returned to its cleared state in which all cores are in the blocked or zero representing state only by the application of a register clearing pulse to terminal *a'*.

When the register is used for continuous direct transformation of a series of sequential binary numbers or words to parallel binary numbers or words, as is the case in many data link or communication systems, a register clearing pulse must be applied after each number or word has been read-out in order to prepare the register to receive the next number or word. In such applications the read-out signal *j* would normally be a single unidirectional pulse and each cycle of the operation of the register would consist of the three basic operations of clear, read-in and read-out. It should, however, be noted that the read-in period need only be long enough to accommodate the *n* pulse intervals for an *n*-bit word. No time intervals need be provided for shifting operations between bits since no shift operation is required by the register of Fig. 1 to transform information from the sequential to the parallel form.

If as shown in Fig. 2, the parallel read-out connections shown in Fig. 1 are changed to a serial read-out through all of the cores, and if certain selected ones of the cores are provided with an additional "set" winding, the information register may be used as a code detection circuit or decoder for a selective call communication system. In Fig. 2 those elements which have already been described in connection with Fig. 1 have been identified by the same reference characters used in Fig. 1. It will, however, be noted that reading signal $j$ is derived from a signal source $j''$ which may, for example, be a local oscillator, and is first applied to read-in winding 43 of core 33. Read-out winding 44 of core 33 is directly connected in series with read-in winding 45 of core 35. In general, each subsequent read-out winding is connected in series with the read-in winding of the succeeding core in the register and the last read-out winding 52 in the register is connected to actuate an alarm 75. Alarm 75 may be a bell, a light, or any other suitable means to indicate that a preselected code or binary number has been applied to the register.

In view of the above mentioned serial connection of the reading signal windings, it is apparent that the reading signal can only actuate the alarm when all of the cores of the register are in the unblocked or "one" representing state so that coupling exists to pass the reading signal between the reading signal input and output windings of each core. If the entire register were initially in its cleared state when the binary number or code was received, it is apparent that the alarm could be actuated only by reception of the single binary number, "11111" which would unblock all of the cores and thus permit the reading signal to actuate the alarm. However, the addition of "set" windings, such as the windings 63, 69 and 71 shown in Fig. 2, permits an $n$ cored register to be selectively responsive to any one of $2^n$ different code numbers. Each of the windings 63, 69 and 71 has one end connected to ground and the other end connected through common conductor 62 to terminal $b''$. It will also be noted that each of the set windings has the opposite sense or phasing from that of the blocking or clear windings 34, 36, 38, 40 or 42 so that the two different types of windings will tend to derive flux in opposite directions when pulses of the same polarity are applied thereto.

In operation a clear pulse, $a$, is first applied to terminal $a'$ thereby causing each of the cores to assume the blocked state illustrated by the flux diagram of Fig. 4. An energy or current limited "set" pulse $b$, as shown in Fig. 3, is then applied to set terminal $b''$ thereby causing each of the cores which has a set winding to assume the unblocked or set state illustrated in the flux diagram of Fig. 5. It will be apparent that in order to cause this desired change the pulse $b$ should have sufficient energy to reverse the flux in the interior path 65, but not enough energy to reverse the flux in peripheral path 66. After the clear and set pulses have been applied, the register is conditioned to selectively respond to or decode an $n$-bit sequential binary number. In the particular example shown in Fig. 2, the only selective call code number which will unblock the entire register and thus actuate the alarm is "01100" as illustrated by the waveform $s$ of the code pulses in Fig. 3.

This may be seen as follows. All of the cores are initially placed in the blocked state shown in Fig. 4 by application of clear pulses $a$. Those cores, such as 33, 39 and 41, which are equipped with set windings to receive the set pulse $b$ are next changed to the unblocked or set state illustrated in Fig. 5. If, as is required, all of the cores are to be in an unblocked state after the code number has been applied to the information input terminal $s'$, it is apparent that those cores which were initially in a blocked state must be unblocked by the code number. Additionally, those cores which were initially in the unblocked or set state must be left in this state by the application of the code number. That is to say, in order for the alarm to be actuated, a binary one must be applied to any core which is initially in the blocked state of Fig. 4 and a binary zero must be applied to any core which is in the unblocked or set state of Fig. 5. If a binary one is applied to any core which is initially in the unblocked or set state, it is apparent that the two coincident half pulses representing the binary one will cause a reversal of the flux in the peripheral path 66. This results in what may be termed a reverse-blocked state of the core. That is to say, it results in a state in which all of the flux directions shown in Fig. 4 are reversed. The core is still blocked, however, inasmuch as the direction of flux in two of the legs included in path 67 again have opposite rotational sense with respect to aperture A.

The application of a binary one to any core which is initially in an unblocked or set state will thus leave it in a blocked state and thereby prevent reading signal $j$ from actuating alarm 75. Conversely any core which does not have a set winding so that it is initially in a blocked state must have a binary one applied to it in order that it may be left in an unblocked state which will similarly permit transmission of signal $j$ to alarm 75. It will be apparent that a given register or decoding circuit may be pre-set to detect any desired code number by appropriately selecting those cores which are to be equipped with set windings. It will, of course, also be apparent that the number representing the polarity conventions selected for purposes of discussion are arbitrary and that any consistent convention may be used. Furthermore, in practice it may be more convenient to place a set winding on each core in the register and selectably connect the desired set windings to conductor 62 through individual switches in a manner consistent with the particular convention being used. Thus, to give another example, if only the cores 35 and 37 of Fig. 2 were placed in the unblocked state by either switch or permanently connected set windings (not shown), then the register would respond only to the binary number "10011" as represented by the waveform $i$ in Fig. 3.

It is thus seen that for any sequentially presented binary number, the network connection of Fig. 1 will transform the number into stored information which may be non-destructively read-out in parallel whereas the network connection of Fig. 2 will selectively recognize or distinguish that particular binary number from all other possible numbers. Of course, after any number has been applied to a register of the type shown in Fig. 2, clearing and set pulses, $a$ and $b$, must again be applied before the next number to be distinguished is applied. In general, these clear and set operations are necessary and sufficient no matter whether the previously applied number was the right or wrong number to satisfy the entire setting of the register. Thus, the cycle of operation of the register of Fig. 1 is clear, read-in, read-out, whereas the cycle of operation of the register of Fig. 2 is clear, set, read-in, read-out.

While the principles of the invention have now been made clear in illustrative embodiments, there will be immediately obvious to those skilled in the art many modifications in structure, arrangement, proportions, the elements and components used in the practice of the invention, and otherwise, which are particularly adapted for specific environments and operating requirements, without departing from those principles. The appended claims are, therefore, intended to cover and embrace any such modifications, within the limits only of the true spirit and scope of the invention.

What we claim and desire to obtain by Letters Patent of the United States is:

1. An information register adapted ot receive sequential $n$-bit binary information comprising, a group of $n$ logical "and" devices, each of said "and" devices having at least two information input terminals, at least one reading signal input circuit, and at least one reading signal output circuit; each of said "and" devices further having two stable states in one of which the signal applied to said reading signal input circuit will be transmitted to said reading signal output circuit and in the other of which it will not be so transmitted; means to initially place each of said "and" devices in a predetermined one of said two stable states; means to derive a sequence of $n$ operating pulses, said sequence of $n$ operating pulses having a predetermined time relationship to each other; means to derive a sequence of $n$-bits of pulsed binary information, including information pulses, synchronized so that successive bits of information coincide with successive operating pulses, the presence of an information pulse indicating a binary "1" and the absence of an information pulse indicating a binary "0" for each of said $n$-bits respectively; means to apply each of said $n$-bits of information simultaneously to a first of said information input terminals of all of said "and" devices so that information pulses are simultaneously applied during the occurrence of a binary "1"; means to apply one of said $n$ operating pulse to a second of said information input terminals of each of said "and" devices sequentially; each of said operating pulses and each of said information-representing pulses having electrical characteristics such that the application to any one of said "and" devices of either pulse alone will not affect its state but the coincident application of an operating and an information pulse will change its state from one to the other of said two stable states; means to apply at least one read-in signal to said reading signal input circuit of at least one of said "and" devices; and means to derive at least one read-out signal from said reading signal output circuit of at least one of said "and" devices.

2. Apparatus as in claim 1 wherein said means to initially place each of said "and" devices in a predetermined one of said two stable states comprises a register clearing terminal to which each of said "and" devices is connected in parallel so that a clearing pulse applied to said terminal will place each of said devices in a like one of said two stable states; wherein said means to apply at least one read-in signal comprises a reading signal input terminal to which said reading signal input circuits of all of said devices are connected in parallel; and wherein said means to derive at least one read-out signal comprises a group of $n$ output terminals each of which is individually and separately connected to the reading-signal output circuit of a different one of said "and" devices; whereby said register is adapted to directly transform said received sequential $n$-bit binary information into stored parallel $n$-bit binary information which can be non-destructively read-out of said register.

3. Apparatus as in claim 1 wherein said means to initially place each of said "and" devices in a predetermined one of said two stable states comprises a register clearing terminal to which each of said "and" devices is connected in parallel so that a clearing pulse applied to said terminal will place each of said devices in a like one of said two stable states and a register setting terminal to which pre-selected ones of said "and" devices are connected in parallel so that a set pulse applied to said terminal will place each of said pre-selected ones of said devices in the other of said two stable states; wherein said means to apply at least one read-in signal comprises means to apply a reading signal to said reading signal input circuit of a first of said devices and means to connect the reading signal input circuit of each succeeding device in electrical series relationship with the reading signal output circuit of the preceding device in said register; and wherein said means to derive at least one output signal comprises an output device connected to the reading signal output circuit of the last of said "and" devices in said register; whereby said register is adapted to actuate said output device in selective response to only one of $2^n$ possible numbers which may be represented by said received sequential $n$-bit binary information.

4. An information register adapted to receive sequential $n$-bit binary information comprising, a group of $n$ logical "and" devices, each of said "and" devices comprising a multipath core consisting of a magnetic material having a substantially rectangular hysteresis characteristic, said core having a plurality of windings thereon affording at least two information input circuits, at least one reading signal input circuit, and at least one reading signal output circuit, said reading signal input and output circuits respectively including a first and a second of said plurality of windings, said first and seocnd windings being linked by a magnetic path which affords minimum or maximum coupling between said windings in accordance with two stable relative states of saturation of portions of said path; means to initially place each of said "and" devices in a predetermined one of said two stable states of minimum or maximum coupling; magnetic delay means to derive from a single trigger pulse a sequence of $n$ operating pulses, said sequence of $n$ operating pulses having a predetermined time relationship to each other; means to derive a sequence of $n$-bits of pulsed binary information, including information pulses, synchronized so that successive bits of information coincide with successive operating pulses, the presence of an information pulse indicating a binary "1" and the absence of an information pulse indicating a binary "0" for each of said $n$-bits respectively, means to apply each of said $n$-bits of information simultaneously to a first of said information input circuits of all of said "and" devices so that information pulses are simultaneously applied during the occurrence of a binary "1"; means to apply one of said $n$ operating pulse to a second of said information input circuits of each of said "and" devices sequentially; each of said information-representing pulses and each of said operating pulses having electrical characteristics such that the application to any one of said "and" devices of either pulses alone will not but the application of both pulses coincidentally will change the coupling between said first and second reading signal windings between said predetermined minimum value and said predetermined maximum value; means to apply at least one read-in signal to said reading signal input circuit of at least one of said "and" devices; and means to derive at least one read-out signal from said reading signal output circuit of at least one of said "and" devices.

5. Apparatus as in claim 4 wherein said means to initially place each of said "and" devices in a predetermined one of said two stable states of minimum or maximum coupling comprises a register clearing terminal to which a third of said plurality of windings of each of said devices is connected in parallel so that a clearing pulse applied to said terminal will place each of said devices in a like one of said two stable states; wherein said means to apply at least one read-in signal comprises a reading signal input terminal to which said reading signal input circuits of all of said devices are connected in parallel; and wherein said means to derive at least one read-out signal comprises a group of $n$ output terminals each of which is individually and separately connected to the reading signal output circuit of a different one of said "and" devices; whereby said register is adapted to directly transform said received sequential $n$-bit binary information into stored parallel $n$-bit binary information which can be nondestructively read-out of said register.

6. Apparatus as in claim 4 wherein said means to initially place each of said "and" devices in a predetermined one of said two stable states of minimum and maximum coupling comprises a register clearing terminal to which a third of said plurality of windings of each of said devices is connected in parallel so that a clearing pulse applied to said terminal will place each of said devices in a like one of said two stable states and a set terminal to which a fourth of said plurality of windings of pre-selected ones of said "and" devices are connected in parallel so that a set pulse applied to said terminal will place each of said pre-selected ones of said devices in the other of said two stable states; wherein said means to apply at least one read-in signal comprises means to apply a reading signal to said reading signal input circuit of a first of said devices and means to connect the reading signal input circuit of each succeeding device in electrical series relationship with the reading signal output circuit of the preceding device in said register; and wherein said means to derive at least one output signal comprises an output device connected to the reading signal output circuit of the last of said "and" devices in said register; whereby said register is adapted to actuate said output device in selective response to only one of $2^n$ possible numbers which may be represented by said received sequential $n$-bit binary information.

References Cited in the file of this patent

UNITED STATES PATENTS

| | | |
|---|---|---|
| 2,753,545 | Lund | July 3, 1956 |
| 2,802,953 | Arsenault | Aug. 13, 1957 |

OTHER REFERENCES

"The Transfluxor," Proceedings of the IRE, March 1956 (Rajchman).

"A New Nondestructive Read for Magnetic Cores" (Arsenault), 1955, Western Joint Computer Conference, August 1955, pages 111–116.